United States Patent [19]

Makigawa

[11] Patent Number: 4,622,610

[45] Date of Patent: Nov. 11, 1986

[54] AUTOMATIC CASSETTE EXCHANGING PLAYBACK DEVICE

[75] Inventor: Yasuyuki Makigawa, Amagasaki, Japan

[73] Assignee: Mitsubishi Denki Kabushiki Kaisha, Tokyo, Japan

[21] Appl. No.: 525,032

[22] PCT Filed: Jan. 7, 1983

[86] PCT No.: PCT/JP83/00002

§ 371 Date: Aug. 9, 1983

§ 102(e) Date: Aug. 9, 1983

[30] Foreign Application Priority Data

| Jan. 8, 1982 | [JP] | Japan | 57-2096 |
| Jan. 8, 1982 | [JP] | Japan | 57-2097 |
| Jan. 8, 1982 | [JP] | Japan | 57-2098 |
| Jan. 8, 1982 | [JP] | Japan | 57-2099 |
| Jan. 8, 1982 | [JP] | Japan | 57-1434[U] |

[51] Int. Cl.$^4$ .................. G11B 15/68; G11B 5/54; G11B 21/22

[52] U.S. Cl. ..................... 360/92; 360/105

[58] Field of Search ............. 360/92, 105, 137, 106; 414/118, 92, 544

[56] References Cited

U.S. PATENT DOCUMENTS

| 3,431,367 | 3/1969 | Nickl | 360/92 |
| 3,848,264 | 11/1974 | Wilson | 360/92 |
| 3,852,818 | 12/1974 | Pyles | 360/92 |
| 4,164,765 | 8/1979 | Gysling | 360/92 |

FOREIGN PATENT DOCUMENTS

| 2356916 | 5/1974 | Fed. Rep. of Germany | 360/92 |
| 50-15643 | 6/1975 | Japan | 360/92 |
| 52-96510 | 8/1977 | Japan | 360/92 |
| 54-137305 | 10/1979 | Japan | 360/92 |
| 55-28134 | 7/1980 | Japan | 360/92 |
| 56-157068 | 11/1981 | Japan | 360/92 |
| 58-208961A | 12/1983 | Japan | 360/92 |
| 59-38965A | 3/1984 | Japan | 360/92 |

OTHER PUBLICATIONS

Radio Electronics, Feb. 1963, p. 27 "New Automatic Tape Changer".

*Primary Examiner*—John H. Wolff
*Assistant Examiner*—Alfonso Garcia
*Attorney, Agent, or Firm*—Lowe, Price, LeBlanc, Becker & Shur

[57] ABSTRACT

An automatic cassette exchanging playback device automatically exchanges cassette tapes for reproduction of records thereon. Cassette reproduction mechanism is elevated or lowered in a vertical direction along a cassette cabinet (200) in which a plurality of cassette tapes (600) are accommodated in a vertical direction. When the cassette reproduction mechanism reaches the position of a desired one of the cassette tapes, a cassette feeder assembly (400) picks up the desired one of the cassette tapes and then loads the same into the cassette reproduction apparatus (500) for reproduction of the records thereon.

14 Claims, 12 Drawing Figures

AUTOMATIC CASSETTE EXCHANGING PLAYBACK DEVICE

TECHNICAL FIELD

The present invention relates to an automatic cassette exchanging playback device, typically a cassette playback device with automated cassette exchange feature which automatically exchanges cassette tapes for continuous reproduction of records thereon, that is, a so-called auto cassette exchanger.

BACKGROUND ART

The design of conventional so-called auto cassette exchangers is directed mainly to exchange of cassette tapes itself, by which one of cassette tapes is selected from a stack of those cassette tapes for reproduction of sound or other records thereon and then returned to a chamber or a cassette store after reproduction thereof and a new one is loaded in place thereof. Those kinds of exchangers are fully described in "TAPE RECORDERS" (Author: Tadaaki Tsuono) published by Nikkan Kogyo Shinbunsha, Jan. 30, 1978, pp 224–228.

Whereas those kinds of auto cassette exchangers are capable of extracting in sequence a plurality of cassette tapes for reproduction, most of those exchangers are unable to pick up any desired one of cassette tapes. In some of cassette exchangers such selection is made available with the aid of a larger and bulky construction.

Then, a playback device with new automatic cassette exchange feature has been proposed by which a plurality of cassette tapes are disposed at a predetermined interval along a vertical direction and a selected one of the cassette tapes is inserted into a cassette deck while the cassette deck travels in a vertical direction. This type of automatic cassette exchanging playback device may be configured as low as the stack of the cassette tapes in the vertical direction because of only the need to move the cassette deck in the vertical direction. However, with this type of automatic cassette exchanging playback device, a control circuit is necessary to move the cassette deck in the vertical direction and pick up the selected one of the cassette tapes.

DISCLOSURE OF THE INVENTION

Briefly stated, according to the present invention, cassette playback means is provided to travel in a vertical direction along a cassette cabinet in which a plurality of cassette tapes are housed in a stack and a desired one of the cassette tapes is brought into the cassette playback means through operation of a cassette feeder assembly for reproduction of records thereon when the cassette playback means reaches a position corresponding to the desired cassette tape. The present invention provides the ability to select and pick up any desired one of the cassette tapes from the cassette cabinet by disposing the plurality of cassette tapes within the cassette cabinet and moving the cassette playback means in the vertical direction along the cassette cabinet and to reproduce the records on the selected one of the cassette tapes by inserting that selected tape into the playback means. The present invention therefore can be utilized in so-called "karaoke (singing machine)" devices and car stereo devices. Especially, in case of car stereo devices, the present invention contributes safe driving, since no manual exchange of cassette tapes is required.

BEST MODE FOR CARRYING OUT THE INVENTION

Figure 1:
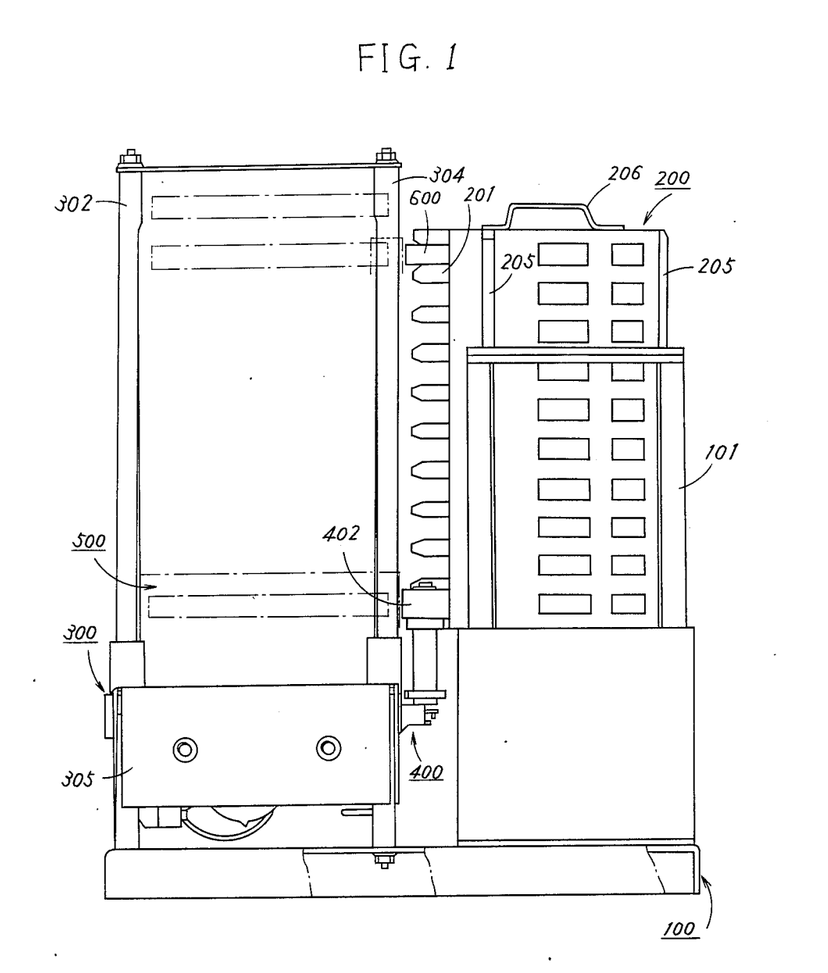
FIG. 1 is a front view of the appearance of a playback device according to an embodiment of the present invention.

Referring to FIGS. 1 through 7, there is illustrated a mechanical structure according to an embodiment of the present invention. An automatic cassette exchanging playback device embodying the present invention, as shown in FIG. 1, generally comprises a basement (100), a cassette cabinet (200), an elevator assembly (300), a cassette feeder assembly (400) and a cassette deck (500). On the basement (100) there is mounted the cassette cabinet (200) in which a total of ten cassette tapes (600) are received. Disposed adjacent the cassette cabinet (200) are elevator tracks (301) through (304) along which an elevator framework (305) travels in a vertical direction. The cassette deck (500) is mounted on an upper portion of the elevator framework (305). The cassette deck (500) is set up by a conventional slot-in type mechanism with automatic eject feature widely used in car stereo devices or other audio devices, that is, a mechanism by which reproduction starts automatically upon inserting one of the cassette tapes (600) in a horizontal direction via an opening. Within the elevator framework (305) there are housed an assembly for elevating and lowering the elevator framework (305) in a vertical direction and the cassette feeder assembly (400) for selecting one of the ten cassette tapes (600) in the cassette cabinet (200) and inserting the selected one of the cassette tapes into the cassette deck (500).

The following will set forth the respective components in more detail. The cassette cabinet (200) is of a box-like configuration with a front opening which is typically made of transparent plastic material. The cassette cabinet (200) is further provided with partitions (201) which partition the ten cassette tapes (600). The top and bottom of the cassette cabinet (200) and the opening sides of the respective partitions (201) are, for example, 1 or 2 mm narrower than the width of the cassette tapes (600). This arrangement is to prevent cassette rollers (401) and (402) described below from coming into contact with the top and bottom of the cassette cabinet (200) and the partitions (201) when the cassette rollers (401) and (402) are forced into pressure contact with the cassette tape (600).

Figure 6:
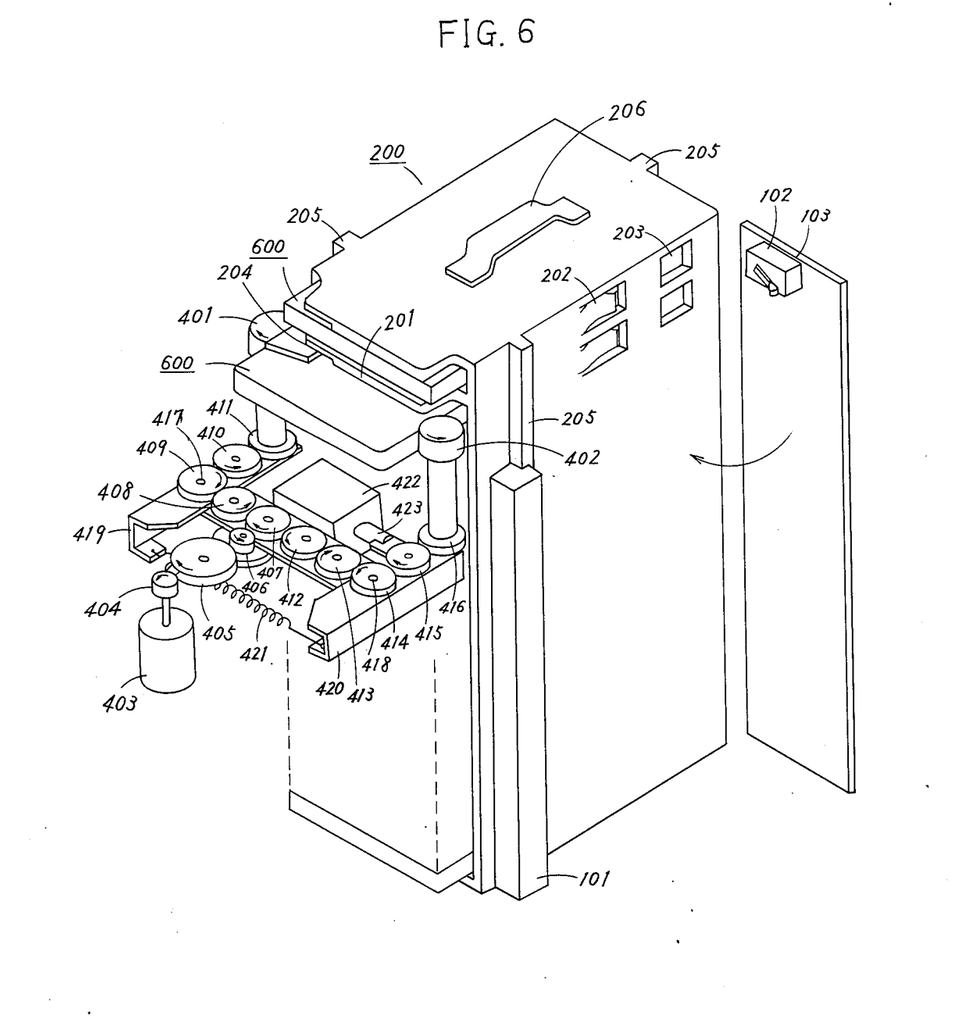
FIG. 6 is a perspective view showing the appearance of the above illustrated embodiment of the present invention.

Furthermore, the top and bottom of the cassette cabinet (200) and the partitions (201) are provided with inward recesses (204) to limit the direction of cassette insertion, as best shown in FIG. 6. The inward recesses (204) not only accommodate bulges on the head contact side (601) of the cassette tapes (600) (i.e. thicker portions of the housings of the cassette tapes (600)) but also prevents wrong insertion of the cassette tapes (600) into the cassette cabinet (200) while keeping the cassette tapes in a horizontal direction. The cassette cabinet (200) is provided at its sides with cassette pressure springs (202) to press the respective cassette tapes (600). The purpose of the cassette pressure springs (202) is to prevent the cassette tapes (600) from falling off the cassette cabinet (200) when the cassette cabinet (200) is inclined. The both sides of the cassette cabinet (200) are further formed with microswitch apertures (203) to receive microswitches (102) which determine if the cassette tape (600) is inserted. It is noted that the microswitches (102) are installed on a switch mounting (103) rotatable with respect to the basement (100).

In addition, vertically extending cassette sliders (205) are formed on the both sides and rear face of the cassette cabinet (200). The basement (100) has a cabinet guide (101) which guides the cassette slider (205) when the cassette cabinet (200) is held upwardly. It is therefore possible to load another cassette cabinet holding a total of ten cassette tapes by pulling upwardly a handle (206) on the cassette cabinet (200) and mounting the second cassette cabinet. Integral molding of the cassette cabinet (200) and the cassette pressure springs (202) is advantageous in saving of manufacturing cost. In case where the cassette cabinet (200) is made of such transparent plastic material as acrylic resin, a surface of the cassette tape casing, especially, the contents of records of that tape identified on the rear of the tape housing are made clearly viewable to offer great convenience for the user.

Figures 2, 3, 7:
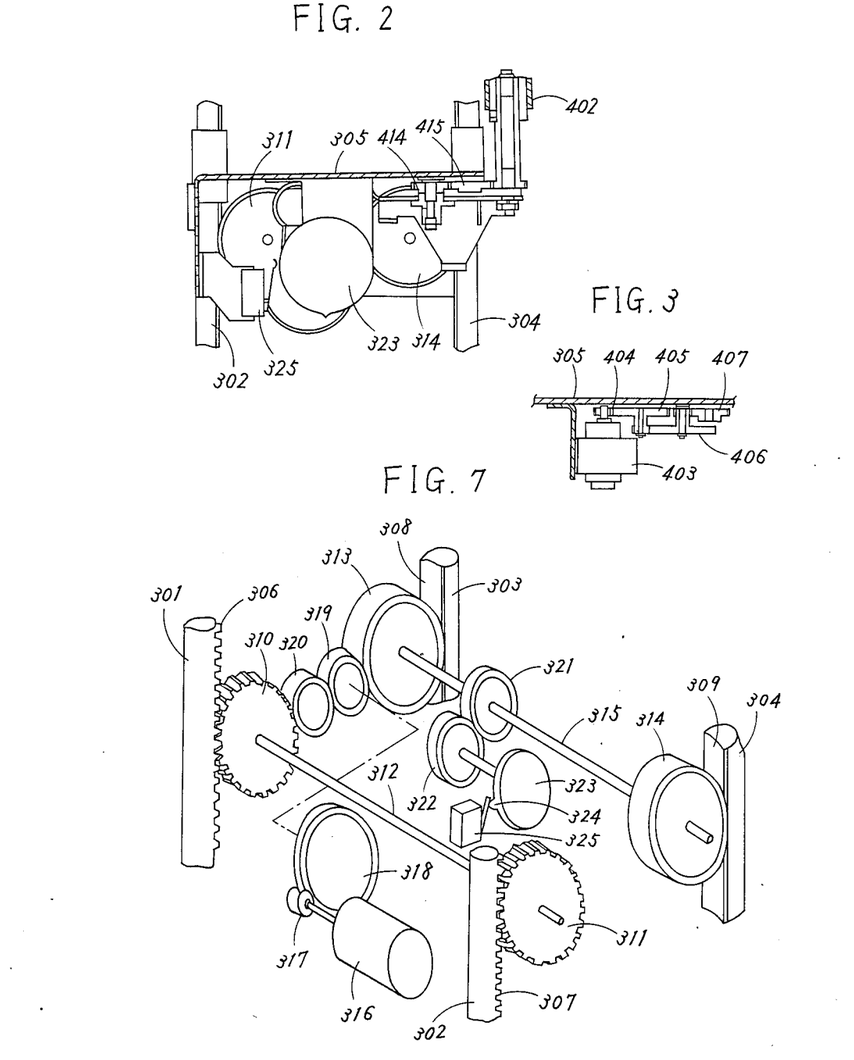
FIG. 2 is a front view of an elevator assembly included in the illustrated embodiment of the present invention.
FIG. 3 is a side view of a major portion of a cassette feeder assembly included in the embodiment.
FIG. 7 is a perspective view of a major portion of the elevator assembly.
Figure 4:
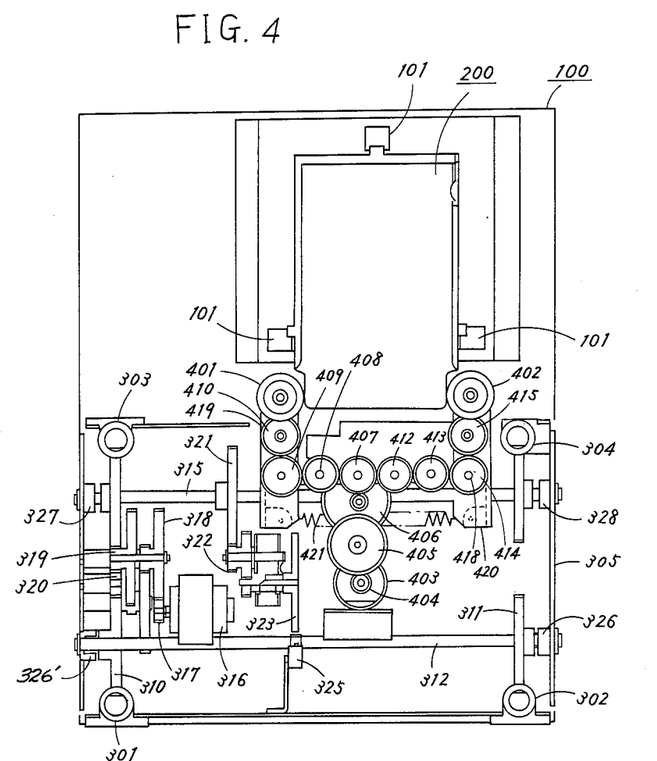
FIG. 4 is a plan view of the above illustrated embodiment.
Figure 5:
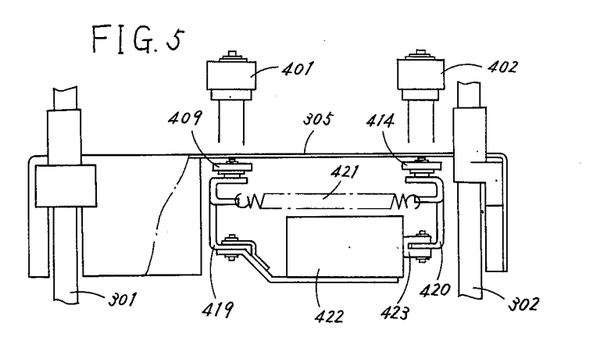
FIG. 5 is a plan view showing a major portion of the cassette feeder assembly.

The elevator assembly (300) will now be described in detail with reference to FIGS. 2, 4 and 7. It is obvious that FIG. 7 shows portion of the structure of FIG. 4 in a simplified manner. Four column-like elevator tracks (301) through (304) are installed in a perpendicular direction on the basement (100). The elevator tracks (301) through (304) are provided with racks (306) through (309), respectively. These racks (306) through (309) are held in meshing relationship with spur gears (310), (311), (313) and (314), respectively. The spur gears (310) and (311) are secured on a rotation shaft (312) both ends of which are held rotatable by means of bearings (326') and (326) embedded in the elevator framework (305) as shown in FIG. 4. Furthermore, the remaining spur gears (313) and (314) are affixed to a rotation shaft (315) both ends of which are held rotatable in bearings (327) and (328) embedded in the elevator framework (305). The spur gear (313) meshes with an idler gear (319) which in turn meshes with a pinion gear (320). The spur gear (310) also meshes with the pinion gear (320). There is further provided a motor (316) which serves as a source of driving force in moving the elevator framework (305) in a vertical direction.

A spur gear (317) is affixed to a rotation shaft of the motor (316). The spur gear (317) is in meshing relationship with a spur gear (318). The spur gear (318) serves to transmit the rotation force of the motor (316) to the idler gear (319).

It is understood that the spur gears (310) and (311) and the spur gears (313) and (314) may be rotated at the same rotation rate but in the opposite direction by the rotation force of the motor (316) when the number of the teeth of the idler gear (319) is equal to that of the pinion gear (320). Moreover, it is possible to either elevate or lower the elevator framework (305) by switching the rotation direction of the motor (316).

It is to be understood that spur gear (317) may be a worm gear (317) installed on the rotation shaft of the motor (316) to operate as a locking device for the elevator framework (305). In other words, the elevator framework (305) needs to stop in a predetermined position when a desired one of the cassette tapes (600) is drawn out of the cassette cabinet (200) and inserted into the cassette deck (500). Although, with the spur gear (317), the elevator framework (305) would fall due to the weight of the cassette deck (500), the use of the worm gear has the advantage of preventing the elevator framework (305) from falling due to the weight of the cassette deck because of engagement between the spur gear (318) and the worm gear.

The elevator assembly (300) configured as above is provided with level detector means which senses the locations of the respective ones of the ten cassette tapes (600) facing the cassette deck (500). A spur gear (321) is installed on the rotation shaft (315) to engage with a spur gear (322). A switch cam wheel (323) is provided to rotate in union with the spur gear (322), which wheel (323) bears a switch cam (324) at a point on the circumference thereof. A level detection switch (325) is provided to engage with the switch cam (324). The switch cam (324) actuates the level detection switch (325) each time the switch cam wheel (323) makes a full revolution.

Assuming that N is the number of teeth of the idler gear (319) and M (in mm) is the module of the gear, the spur gears (310), (311), (313) and (314) move by $\pi$NM (in mm) along the racks (306), (307), (308) and (309) when the pinion rotation shaft makes a full revolution. On the other hand, assuming that $H_P$ is the one-pitch height of the cassette tapes (600) in the cassette cabinet (200) and is selected to satisfy $H_P = \pi NM$, the elevator framework (305) rises or lowers by the height of one cassette tape whenever the level detection switch (325) turns from OFF to ON. Therefore, if the elevator framework (305) stands at the second level and a control unit (700) discussed later provides a command to elevate it up to the seventh level, then the elevator motor (316) is brought into a sudden stop to place the elevator framework up to the seventh level when the level detection switch (325) turns from ON to OFF five times. In other words, it is possible to bring the elevator framework (305) into a stop in any specified position.

The elevator assembly (300) described previously may elevate or lower the elevator framework (305) while keeping it in a correct horizontal position, since the spur gears (310), (311), (313) and (314) are given the same driving force to move along the four elevator tracks (301) through (304) as the four driving wheels. Furthermore, only one level detection switch (325) is needed to stop the cassette cabinet (200) in any position corresponding to a selected one of the ten cassette tapes therein, since the height of each cassette tape in the cassette cabinet (200) corresponds to the full revolution of the idler gear (319) utilizing rotation of the spur gears (310), (311), (313) and (314). Should the worm gear be installed in a driving system for driving the elevator framework (305), it offers the advantage that the elevator framework may be held in any stop position without any stop device.

The cassette feeder assembly (400) will be discussed with reference to FIGS. 3 through 6. The cassette feeder assembly (400) is associated with the elevator framework (305). A pair of roller levers (419) and (420) are disposed within the elevator framework (305). A cassette roller (401) directly coupled with a spur gear (411) is installed at one end of one of the roller levers (419) for rotation. Another cassette roller (402) directly coupled with a spur gear (416) is likewise installed on the other roller lever (420). The cassette rollers (401) and (402) when rotating in pressure contact with the cassette tape (600) move the cassette tape (600) out of and into the cassette cabinet (200).

To drive and rotate the cassette rollers (401) and (402), a feeder motor (403) is mounted in the elevator framework (305). A spur gear (404) is affixed to the rotation shaft of the feeder motor (403). Spur gears (405) through (410) and (412) through (415) are disposed between the spur gear (404) and the spur gear (411) in direct connection with the cassette roller (401) and the spur gear (416) in direct connection with the cassette roller (402). When the feeder motor (403) rotates counterclockwise, the cassette roller (401) rotates clockwise through the spur gears (404) through (411) and the cassette roller (402) rotates counterclockwise through the spur gears (404) through (407) and (412) through (416). Provided that the left side gearing for transmitting rotation force to the cassette roller (401) has the same number of teeth as that of the right side gearing for transmitting rotation force to the cassette roller (402), both the cassette rollers (401) and (402) may rotate at the same rotation rate.

It is noted that one of the roller levers (419) is held rotatable in the elevator framework (305) via a rotation shaft (417) of the spur gear (409) and the other roller lever (420) is likewise held rotatable in the elevator frame (305) via a rotation shaft (418) of the spur gear (414). A coil spring (421) is installed between the remaining end of the roller lever (419) and the remaining end of the roller lever (420). It is clear from FIG. 5 that a solenoid (422) is mounted on the remaining end of the roller lever (419) by means of a fixture (424) and a plunger (423) is installed on one end of the roller lever (420). When the solenoid (422) is disenergized, the coil spring (421) pulls the remaining end portions of the roller levers (419) and (420). Upon energization of the solenoid (422) the plunger (423) is drawn into the solenoid (422) to pull the remaining end portions of the roller levers (419) and (420). In other words, the cassette rollers (401) and (402) move out of or come into pressure contact with the cassette tape (600) when the solenoid (422) is disenergized or energized, respectively.

In this manner, the cassette tape (600) may be moved in a straight line in a horizontal direction by means of the two cassette rollers (401) and (402) which rotate in the opposite directions at the same rotation rate so as to move closely to each other. Another advantage is that all that is necessary to remove and insert the cassette tape (600) out of and into the cassette cabinet (200) is to electrically switch the rotation direction of the feeder motor (403). Moreover, since the rotation shaft (417) of the spur gear (409) and the rotation shaft (418) of the spur gear (414) serve also as the rotation shafts for the roller levers (419) and (420), constantly stable rotation force is transmitted from the feeder motor (403) affixed to the elevator framework (305) to the cassette rollers (401) and (402) even when the roller levers (419) and (420) rotate. With the solenoid (422) on the roller lever side (419) and the plunger (423) on the roller lever side (420), it is further advantageous in that the cassette rollers (401) and (402) may come into pressure contact with the cassette tape (600) at the same pressure and in the opposite rotation directions at all times.

Figure 8:
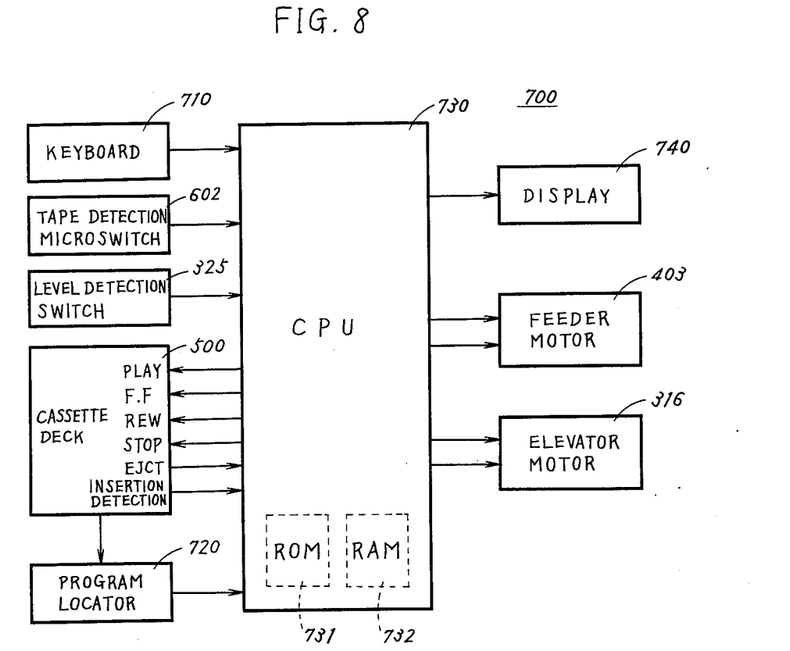
FIG. 8 is a schematic block diagram of a control unit included in the above illustrated embodiment of the present invention.

FIG. 8 is a schematic block diagram of the control unit (700) included in the above illustrated embodiment of the present invention. The control unit (700) provides various electric controls for the elevator assembly (300), the cassette feeder assembly (400) and the cassette deck (500) as described with respect to FIGS. 1 through 7. An architecture of the control unit (700) will be described by reference to FIG. 8. Although discussed with respect to FIG. 9 latter, a keyboard (710) is to select one of the ten cassette tapes (600) in the cassette cabinet (200) and select any one of programs recorded on that selected one of the cassette tapes (600). Key signals via the keyboard (710) are fed to a CPU (730). As suggested with respect to FIG. 6, the tape detection microswitch (602) determines if any cassette tape (600) is loaded in the cassette cabinet (200) and feeds a detection output signal to the CPU (730). The cassette deck (500) is supplied with a play command (PLAY), a fast forward command (F, F), a rewind command (REW) and a stop command (STOP) from the CPU (730). The cassette deck (500) feeds an eject signal (EJCT) and an insertion detection signal to the CPU (730). The eject signal is a signal that is developed to eject the cassette tape (600) upon completion of reproduction and the insertion detection signal is one that is developed when any of the cassette tapes (600) is inserted into an operating position in the cassette deck (500).

Audio signals reproduced by the cassette deck (500) are fed to a program locator circuit (720). The program locator circuit (720) is to find any program-to-program silence on the cassette tape (600) and implemented with a well known circuit. When finding a program-to-program silence, the program locator circuit (720) feeds a detection output signal to the CPU (730). A display (740) is to provide a visual display of numbers indicating the identity of an cassette tape (600) and the identity of any program on that cassette tape as introduced via the keyboard (710). The above described feeder motor (403) for driving of the cassette feeder assembly (400) is fed with a rotation direction switch signal and a start signal from the CPU (730). The elevator motor (316) for driving the elevator assembly (300) is also fed with a rotation direction switch signal and a start signal from the CPU (730).

The CPU (730) is implemented with a one-chip microcomputer or the like and includes a read only memory (ROM) (731) and a random access memory (RAM) (732). The ROM (731) stores programs as shown in FIGS. 10 through 12, while the RAM (732) stores data introduced via the keyboard (710) or calculated by the CPU (730).

Figure 9:
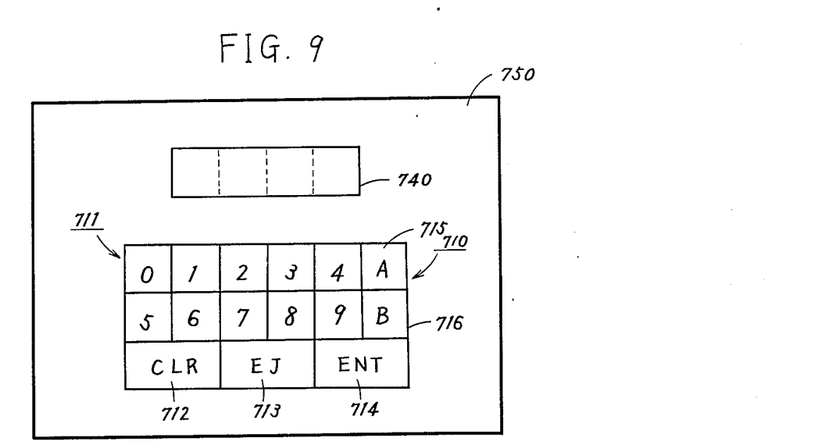
FIG. 9 is an external view of an operational panel.

FIG. 9 is an external view of an operational panel (750). The operational panel (750) includes the keyboard (710) and the display (740). The keyboard (710)

has digit keys (711), clear keys (CLR) (712), an eject (EJ) key (713), an entry (ENT) key (714), an A side key (715) and a B side key (716). The digit keys (711) are to input cassette identifying numbers and program identifying numbers and the clear key (712) is to cancel numerical data introduced via the digit keys (711). The eject key (713) is to eject the cassette tape (600) from the cassette deck (500). The entry key (714) is to provide a play command for the cassette deck (500).

Figure 10:
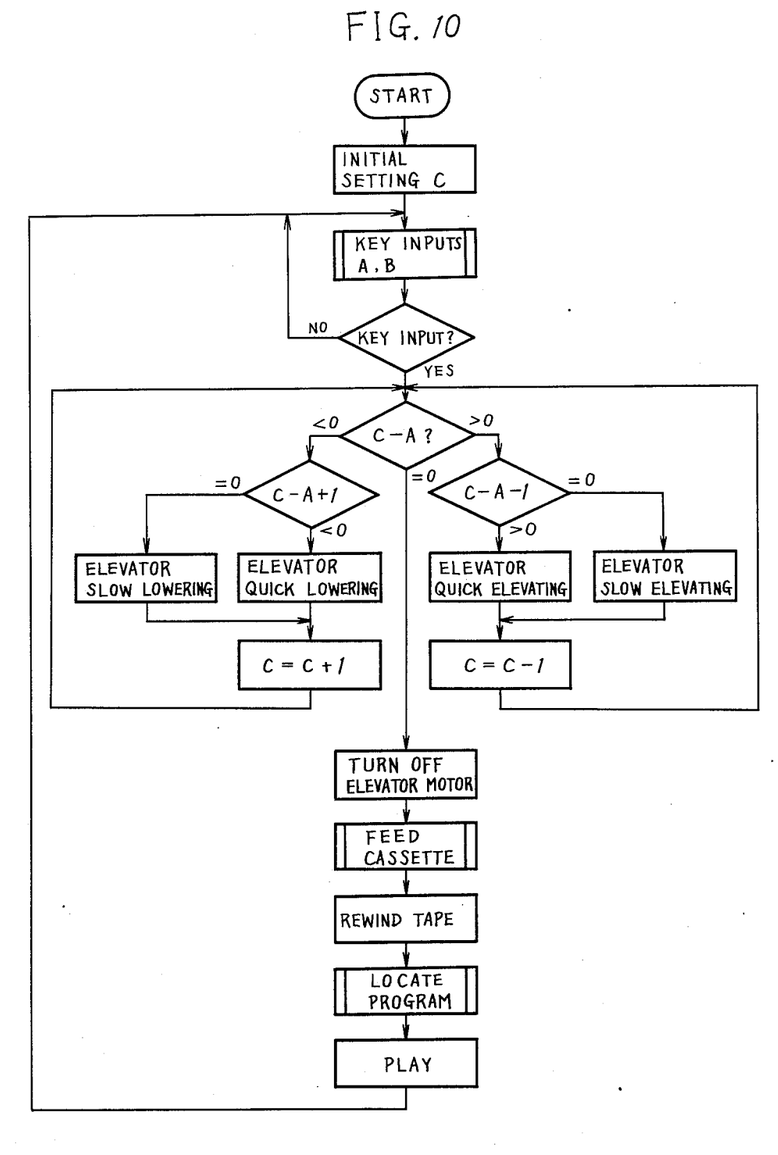
FIGS. 10 through 12 are flow charts describing operations of the control unit which governs the elevator assembly, the cassette feeder assembly and a cassette deck.
Figure 11:
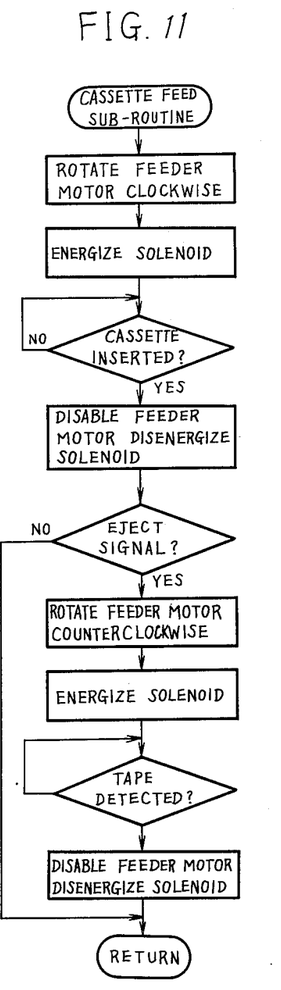
Figure 12:
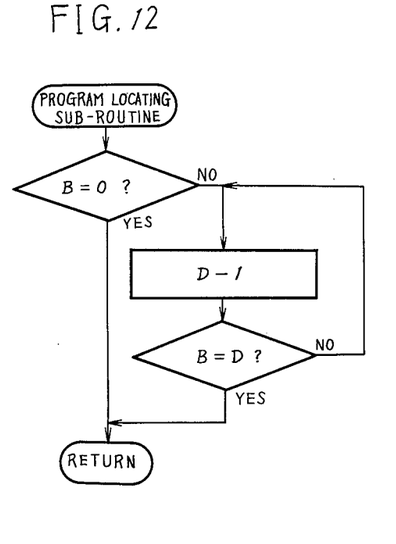

FIGS. 10 through 12 are flow charts describing operations of the control unit (700) which governs the elevator assembly (300), the cassette feeder assembly (400) and the cassette deck (500).

Operation of the playback device according to the embodiment of the present invention will now be described in further detail with reference to FIGS. 1 through 12. A total of ten cassette tapes (600) are loaded into the cassette cabinet (200) and the cassette cabinet (200) is mounted in place on the basement (100) with the cassette slider (205) being guided by the cabinet guide (101). Upon application of power supply, initial clearing takes place. That is, the contents of the RAM (732) in the CPU (730) are cleared away. When this occurs, the elevator motor (316) is fed with the start signal so that the elevator framework (305) rises up to the highest level. Although not shown in the drawings, a switch which is incorporated into the elevator track (301) to determine if the elevator framework (305) reaches the highest level provides a detection output signal to the CPU (730). It is obvious that switches or the like for sensing the instantaneous position of the elevator framework (305) may be disposed to correspond to the positions of the respective cassette tapes (600), instead of the above mentioned switch. In the latter case, there is no need to elevate the elevator framework (305) up to the highest level under the initial state. Once the CPU (730) has been supplied with such detection output signal, it places an initial value C into the RAM (732).

After initial setting, the CPU (730) decides if any key input has been introduced via the keyboard (710) and is ready to receive key inputs if not. It is assumed that a numerical representation of program B on tape A has been inputted via the digit keys (711) on the keyboard (710). The CPU (730) permits the RAM (732) to store that numerical representation and the display (740) to display that numerical representation. The CPU (730) then proceeds to the step of evaluating the difference C−A (C: the initial value). This is a determination step for determining whether the elevator framework (305) is to be elevated, stopped or lowered. For example, if C−A>0, the elevator framework (305) is to be elevated and the CPU proceeds to the check routine as for C−A−1. This step is to decide if the elevator framework (305) stands in the neighborhood of the specified one of the cassette tapes. As long as C−A−1 is "0", it indicates that the elevator framework (305) is located very closely to the specified one of the cassette tapes and thus elevates the elevator framework (305) at a slow speed. That is, the CPU (730) permits rotation of the elevator motor (316) at a slow speed. Provided that C−A−1>"0", it indicates that the elevator framework (305) is two or more levels away from an intended level and permits high speed rotation of the elevator motor (316) to elevate the elevator framework (305) at a higher permissible speed.

Under these circumstances, the switch cam (324) actuates the level detection switch (325) each time the elevator framework (305) goes up one level. The detection output signal from the level detection switch (325) is fed to the CPU (730). The CPU (730) decrements the initial value C by "1" each time the level detection switch (325) is actuated. The CPU (730) repeats the above described procedure and more particularly permits the elevator motor (316) to rotate at a slow speed when the elevator framework (305) approaches the position of the intended cassette tape and brings the elevator motor (316) to a stop when C−A is "0" and hence when the elevator framework (305) aligns with the position of intended cassette tape. The elevator framework (305) is lowered in a manner similar to the above method. If C−A<"0", then the elevator motor (316) is instructed to rotate at a slow speed when the elevator framework (305) stands close to the position of the intended cassette tape, and to lower the elevator framework (305) at a high speed when the elevator framework (305) is far away from the selected one of the cassette tapes. When the elevator framework (305) reaches the selected cassette tape in this manner, the elevator motor (316) discontinues rotating and renders the cassette feeder assembly (400) operable.

The cassette feeder assembly is governed under a sub-routine as shown in FIG. 11. The CPU (730) starts rotation of the feeder motor (403) and energizes the solenoid (422). Upon rotation of the feeder motor (403) the cassette feeder rollers (401) and (402) rotate in the opposite directions. Concurrently, the solenoid (422) attracts the plunger (423) so that the one end portion of each of the roller levers (419) and (420) is pulled against the spring force of the coil spring (421) and the pair of the cassette rollers (401) and (402) are forced into pressure contact with the cassette tape (600). As a result, the rotation force of the cassette rollers (401) and (402) is exerted to pull the cassette tape (600) out of the cassette cabinet and insert the same into cassette deck (500). Once the cassette tape (600) has been loaded into the cassette deck (500), the insertion detection signal is supplied to the CPU (730). Immediately after being supplied with the insertion detection signal, the CPU (730) stops rotating of the feeder motor (403) as well as disenergizing the solenoid (422). The cassette rollers (401) and (402) stop rotating and the cassette rollers (401) and (402) move away from the vicinity of the cassette rollers (401) and (402) cabinet (200) by means of the spring force of the coil spring (421).

Thereafter, the CPU (730) decides if the eject signal has been fed from the cassette deck (500). Unless the eject signal has been supplied the CPU would return to the main routine as depicted in FIG. 10. The CPU (730) provides the rewind command for the cassette deck (500). Upon receipt of the rewind command the cassette deck (500) starts rewinding the cassette tape. Under these circumstances a pickup head (not shown) of the cassette deck (500) is in close proximity to the cassette tape to sense a program-to-program silence with the aid of the program locator circuit (720). In response to a silence detection signal from the program locator circuit (720), the CPU (730) initiates a program-locating sub-routine as suggested in FIG. 12.

The program-locating sub-routine starts with the decision as to whether the program identifying number B introduced via the keyboard (710) is "0". When B is "0", the cassette tape is rewound and the program in question is the first of the programs recorded thereon. In this case, the CPU (730) returns to the main routine and issues the play command to the cassette deck (600)

at once. Otherwise, the CPU (730) decrements an initial setting D by "1" whenever the program locator circuit (720) supplied the program (silence) detection signal. This setting D is one that is loaded into the RAM (732) when the cassette tape is rewound. The CPU (730), whenever the program detecting signal is applied thereto, decides if B=D and in other words if the selected program identifying number is identical with that of a program to be reproduced after completion of rewinding. The above operational procedure is repeated until both coincide with each other. If B=D, then the CPU (730) returns to the main routine. The CPU (730) therefore sends the play command to the cassette deck (500).

The cassette deck (500) plays back the cassette tapes in sequence starting with the selected one of the cassette tapes and sends the eject signal to the CPU (730) upon completion of reproduction of all of the programs. The CPU (730) in the sub-routine of FIG. 11 acknowledges receipt of such eject signal, thus enabling the feeder motor (403) and energizing the solenoid (422). It is to be understood that the feeder motor (403) is permitted to rotate in a direction opposite that when to pull the cassette tape (600) out of the cassette cabinet (200). Upon energizing the solenoid (422) the plunger (423) is attracted to place the cassette rollers (401) and (402) into proximity to the cassette cabinet (200) again. The cassette rollers come into pressure contact with the cassette tape ejected out of the cassette deck (500) and returns it to the cassette cabinet (200). After re-insertion of the cassette tape into the cassette cabinet (200) a tape detection microswitch (602) senses it and sends a detection output signal to the CPU (730). The CPU (730) in turn disables the feeder motor (403) and disenergizes the solenoid (422).

When the eject key (713) is actuated, the CPU (730) sends the stop command to the cassette deck (500). The cassette deck (500) immediately feeds the eject signal to the CPU (730). In the same manner as discussed above, the CPU (730) operates to re-load into the cassette cabinet (200) the cassette tape ejected out of the cassette deck (500).

In the above illustrated embodiment, upon introduction of the tape identifying number and the program identifying number with the digit keys (711) of the keyboard (710) and actuation of the entry key (714), the selected one of the cassette tapes is picked up out of the cassette cabinet (200) and inserted into the cassette deck (500) and the selected one of the programs is thereafter located through operation of the program locator circuit (720). It is further possible that programs may be reproduced automatically on a predetermined order when any desired tape identifying numbers and any desired program identifying numbers are stored in the RAM (732) in advance. It is also possible to reproduce continuously beginning with the first program of the first tape and ending with the last program of the tenth tape or reproduce repeatedly any desired program or programs. These modes of operation are easily available as long as the control unit (700) is implemented with the microcomputer.

A special mode of operation is also available. The auto reverse type of cassette decks is generally capable of reproducing signals on A and B sides of the cassette tape (600) at the same time through the utilization of a signal head. Provided that normal music programs are recorded on the A side and particular predetermined signals are recorded on the B side, for example, pulse codes characteristic of "1" in a position corresponding to the first program, pulse codes characteristic of "2" in a position corresponding to the second program and so forth, the rewinding routine as in FIG. 10 may be eliminated the tape may be rewound up to the intended program at once. Furthermore, in case where there are provided a pair of the automatic cassette exchanging playback devices under common control of the control unit, it is very useful to so-called "karaoke" device because of the ability to reproduce in sequence all of desired programs.

Whereas in the above illustrated embodiment the ten cassette tapes (600) are accommodated within the cassette cabinet (200), it is obvious that a larger number of cassette tapes may be accommodated within the cassette cabinet (200). In this case, the elevator tracks (301) through (304) should be extended to conform to the increased height of the cassette cabinet (200). It is further practically possible to listen to programs while watching its texts on TV, provided that the cassette tape (600) for stereophonic use with right and left tracks is used and the identifying codes are recorded on the right track and text information associated with its programs are recorded on the left track and reproduced and supplied as RF signals to TV or the like.

INDUSTRIAL APPLICABILITY

Although in the above illustrated embodiment the present invention is applied to automatic exchange of the cassette tapes having records of audio signals, the present invention should not be limited thereto and is equally applicable to cassette data recorders for use as recording devices in the field of computers.

What is claimed is:

1. An automatic cassette exchanging playback device for selecting any one of a plurality of magnetic cassette tapes for reproduction of records thereon, comprising:
cassette reproduction means for reproduction of the records on said magnetic cassette tapes;
an elevator assembly for elevating and lowering said cassette reproduction means in a vertical direction;
a cassette cabinet disposed adjacent said elevator assembly for receiving the plurality of the magnetic cassette tapes therein in a vertical direction;
a cassette feeder assembly for picking up one of said magnetic cassette tapes out of said cassette cabinet inserting the same into said cassette reproduction means;
selection command means for providing a command for selection of any one of the magnetic cassette tapes in said cassette cabinet; and
control means for controlling said elevator assembly in response to the command from said selection command means to elevate or lower said cassette reproduction means and stop said elevator assembly at a position corresponding to the selected one of the magnetic cassette tapes in said cassette cabinet, said control means further controlling said cassette feeder assembly to pick up the selected one of the magnetic cassette tapes out of said cassette cabinet and insert the same into said cassette reproduction means and further comprising
a pair of roller levers each rotatable about a pivot and having one end extending adjacent both sides of the magnetic cassette tape, repsectively, in said cassette cabinet;

rollers installed on said one end of said pair of the roller levers and held in contact with the both sides of said magnetic cassette tape;

a spring member for pulling the remaining end of each of said pair of the roller levers so as to move them closely to each other;

means for attracting said remaining end of each of said pair of the roller levers against the spring force of said spring member upon energization thereof, thus bringing said rollers into contact with sides of said magnetic cassette tape;

rotation force transmission means for transmission of rotation force into said respective rollers; and a motor for rotating said rollers in different directions via said rotating force transmission means;

wherein said cassette feeder assembly picks up said magnetic cassette tape out of said cassette cabinet when said attracting means is energized to place said respective rollers into contact with the sides of said magnetic cassette tape and the rotation direction of said motor is controlled to rotate said rollers in a certain direction, and said cassette feeder assembly inserts said magnetic cassette tape into said cassette cabinet when said rollers are rotated in a different direction.

2. An automatic cassette exchanging playback device in accordance with claim 1, which further comprises:

instantaneous position detection means for detecting the instantaneous position of said elevator assembly;

elevator assembly control means for sensing the instantaneous position of said elevator assembly from the output of said instantaneous position detection means in response to the command for selection of any one of the magnetic cassette tapes fed from said selection command means, said elevator assembly control means determining from the results of such sensing operation whether said elevator assembly is to be elevated or lowered and elevating or lowering said elevator assembly according to the results of such determination, said elevator assembly control means further forcing said elevator assembly to a stop at the position of the selected magnetic cassette tape in response to the output of said position detection means;

cassette feeder assembly control means for controlling said cassette feeder assembly in response to stop of said elevator assembly to pick up the selected one of the magnetic cassette tapes and insert the same into said cassette reproduction means, said cassette feeder assembly control means further controlling said cassette feeder assembly in response to an end signal from said cassette reproduction means to load the magnetic cassette tape ejected out of said cassette reproduction means into its corresponding position in said cassette cabinet.

3. An automatic cassette exchanging playback device in accordance with claim 2 wherein said elevator assembly control means operates to elevate or lower said elevator assembly at a high speed when said elevator assembly is remote from the position of the selected magnetic cassette tape and operates to elevate or lower said elevator assembly at a slow speed when said elevator assembly is close to said position of the selected cassette tape.

4. An automatic cassette exchanging playback device in accordance with claim 2 wherein said selection command means includes program selection command means for selection of any one of programs recorded on the selected magnetic cassette tape;

said playback device further including;

program detection means for sensing a silence in the records being reproduced by said cassette reproduction means; and fast forward control means for bringing said cassette reproduction means into fast forward mode in response to a selection command from said program selection command means until said program detection means finds a selected program.

5. An automatic cassette exchanging playback device in accordance with claim 1 wherein said elevator assembly comprises:

a support member for supporting said cassette reproduction means;

means for guiding said support member in a vertical direction;

driving means for elevating or lowering said support member in a vertical direction along said guiding means; and detection means for sensing that said support member is elevated or lowered a distance corresponding to a predetermined interval.

6. An automatic cassette exchanging playback device in accordance with claim 5 wherein said guiding means is provided with a rack;

said support member is provided with a spur gear meshing with the rack of said guiding means; and said driving means includes a motor; and rotation force transmission means for reducing the rotation speed of said motor and rotating said spur gear.

7. An automatic cassette exchanging playback device in accordance with claim 6 wherein a rotation shaft of said motor bears a worm gear affixed thereto; and said rotation force transmission means includes a spur gear meshing with said worm gear.

8. An automatic cassette exchanging playback device in accordance with claim 5, which further comprises;

a cam wheel having a projection at a predetermined interval on its circumference and rotating with the rotating force from said rotation force transmission means; and a switch having a contact which is closed upon actuation by said projection each time said cam wheel makes a full revolution.

9. An automatic cassette exchanging playback device in accordance with claim 1 wherein said cassette cabinet includes:

a box-like casing member having an opening at its front face;

a partition member disposed in said casing member for receiving the plurality of magnetic cassette tapes in a vertical direction; and a hold member disposed at a side of said casing member for holding the respective ones of said magnetic cassette tapes within said casing member while pressing a side of the respective one of the magnetic cassette tapes.

10. An automatic cassette exchanging playback device in accordance with claim 9 wherein said casing member, said partition member and said hold member are made of transparent plastic material as an integral unit.

11. An automatic cassette exchanging playback device in accordance with claim 9, and wherein the top and bottom of said casing member and the opening side of said partition member are slightly narrower than the width of the magnetic cassette tapes to prevent the rollers from contacting with the top and bottom of the casing member and said partition when the rollers are forced into pressure contact with the cassette tape.

12. An automatic cassette exchanging playback device in accordance with claim 9 wherein cutouts are formed inside the top and bottom of said casing member and at both sides of said partition member to limit the insertion direction of the magnetic cassette tapes.

13. An automatic cassette exchanging playback device in accordance with claim 1 wherein
said rotation force transmission means includes a plurality of spur gears for transmission of rotation force into said rollers; and
said plurality of the spur gears are disposed for each of said pair of the rollers levers and the rotation shafts of a pair of spur gears in said plurality of spur gears serves as pivots for said pair of roller levers.

14. An automatic cassette exchanging playback device for selecting any one of a plurality of magnetic cassette tapes for reproduction of records thereon, comprising:
cassette reproduction means for reproduction of the records on said magnetic cassette tapes;
an elevator assembly for elevating and lowering said cassette reproduction means in a vertical direction;
a cassette cabinet disposed adjacent said elevator assembly for receiving the plurality of the magnetic cassette tapes therein in a vertical direction;
a cassette feeder assembly for picking up one of said magnetic cassette tapes out of said cassette cabinet and inserting the same into said cassette reproduction means;
selection command means for providing a command for selection of any one of the magnetic cassette tapes in said cassette cabinet; and
control means for controlling said elevator assembly in response to the command from said selection command means to elevate or lower said cassette reproduction means and stop said elevator assembly at a position corresponding to the selected one of the magnetic cassette tapes in said cassette cabinet, said control means further controlling said cassette feeder assembly to pick up the selected one of the magnetic cassette tapes out of said cassette cabinet and insert the same into said cassette reproduction means and further comprising
instantaneous position detection means for detecting the instantaneous position of said elevator assembly;
elevator assembly control means for sensing the instantaneous position of said elevator assembly from the output of said instantaneous position detection means in response to the command for selection of any one of the magnetic cassette tapes fed from said selection command means, said elevator assembly control means determining from the results of such sensing operation whether said elevator assembly is to be elevated or lowered and elevating or lowering said elevator assembly according to the results of such determination, said elevator assembly control means further forcing said elevator assembly to a stop at the position of the selected magnetic cassette tape in response to the output of said position detection means;
cassette feeder assembly control means for controlling said cassette feeder assembly in response to stop of said elevator assembly to pick up the selected one of the magnetic cassette tapes and insert the same into said cassette reproduction means, said cassette feeder assembly control means further controlling said cassette feeder assembly in response to an end signal from said cassette reproduction means- to load the magnetic cassette tape ejected out of said cassette reproduction means into its corresponding position in said cassette cabinet and wherein said elevator assembly control means operates to elevate or lower said elevator assembly at a high speed when said elevator assembly is remote from the position of the selected magnetic cassette tape and operates to elevate or lower said elevator assembly at a slow speed when said elevator assembly is close to said position of the selected cassette tape.

* * * * *